(12) United States Patent
Herbozo

(10) Patent No.: US 6,387,439 B1
(45) Date of Patent: May 14, 2002

(54) BABY EEL SUBSTITUTE AND METHOD OF FABRICATION THEREOF

(76) Inventor: Jon Manterola Herbozo, Casa Galardi, 6, 20170 Aginaga-Usurbil, Gipuzkoa (ES)

( * ) Notice: Subject to any disclaimer, the term of this patent is extended or adjusted under 35 U.S.C. 154(b) by 0 days.

(21) Appl. No.: 09/579,729

(22) Filed: May 26, 2000

(51) Int. Cl.[7] ............................................. A22C 25/00
(52) U.S. Cl. .................... 426/643; 426/249; 426/513
(58) Field of Search ........................... 426/643, 249, 426/513

(56) References Cited

U.S. PATENT DOCUMENTS

| | | | | |
|---|---|---|---|---|
| 4,362,752 A | * | 12/1982 | Sugino | 426/104 |
| 4,399,161 A | * | 8/1983 | Nakamura | 426/643 |
| 4,919,959 A | * | 4/1990 | Hosaka | 426/574 |
| 5,863,594 A | * | 1/1999 | Eizmendi et al. | 426/643 |
| 5,965,191 A | * | 10/1999 | Kayayama | 426/643 |

FOREIGN PATENT DOCUMENTS

EP 0396487 * 2/1994

* cited by examiner

*Primary Examiner*—Carolyn Paden
(74) *Attorney, Agent, or Firm*—Robert M. Schwartz

(57) ABSTRACT

Part of "surimi" in a sequential thermal treatment process comprising four stages: drainage of excess water; preliminary cooking in oil; final cooking in oil and drainage of excess oil; incorporating ground fish muscle, between 50 and 60% of final total mass; water in a state just prior to freezing, from 8 to 12%; white wine from 2 to 4%; vegetable or animal oil, from 1 to 2%; salt, from 1 to 3%; sugar, up to 1%; ovoalbumin, from 4 to 6%; flours, from 7 to 16%; starch form 7 to 16%; garlic and white pepper up to 0.5% each; cryoprotectors, up to 0.5%; potassium sorbate up to 0.5%; aromas of crab, oyster and eel, between 1 and 1.5%; alginates up to 2% and cephalopod ink in varying proportions up to 4%.

2 Claims, No Drawings

BABY EEL SUBSTITUTE AND METHOD OF FABRICATION THEREOF

OBJECT OF THE INVENTION

The invention here disclosed relates to a baby eel substitute and a method of fabrication thereof, from among the food products based on fish derivatives known as "surimi" and their industrial fabrication methods.

The invention is characterised by a special formulation of the substitute which incorporates additives which determine the texture, organoleptic characteristics, nutritional properties and external appearance of the final product, but above all it is characterised by the fabrication process, improved in its thermal treatment stage, such that it is these changes which allow to formulate the substitute in the aforementioned manner.

BACKGROUND OF THE INVENTION

Fish derivatives known as surimi, that is, fish muscle ground, washed and rinsed, have been known in the market for years so that they are sufficiently well known and no further description is required.

One of these food products based on surimi is baby eel substitute, which since its first registration (ES2010637) has been changed in its formulation and improved in its fabrication process, incorporating new elements to its external appearance, such as a dark back (ES2048672, ES2049654, ES2125196, ES2034920, ES2055668), simulated eyes (ES2048672, ES2125196, ES2055668), spindle like shape (ES2048672, ES2055668) or mixed textures (ES2049654).

All baby eel substitutes have in common a majority surimi base to which are added several ingredients, some of which are necessarily always present while others are specific of each invention, and in any case are incorporated in varying proportions. Each baby eel substitute is therefore characterised by its specific ingredients which are not present in others, as well as by the proportion of the main ingredients which in many cases, as in this one, are clearly outside the provisions of the preceding inventions.

Among essential ingredients are salt (sodium or potassium chloride), water, additives to increase the elasticity of the product, (ovoalbumin, starch, surfactant agents, calcium and magnesium salts or vegetable proteins), gelling agents, (agar-agar), alginates, carrageens or collagens) and further products which increase the jellification capacity, such as starch (vegetable fecula or flour of various origins), ovoalbumin or even blood plasma)

Among the specific additives are those responsible for the optical and organoleptic properties of the finished product, such as added proteins, flavour additives, aroma or colouring. In this group may also be included cryoprotection agents, as the most frequent form of conservation of the finished product is freezing.

Continuing this analysis of the background, fabrication processes could be grouped about a model which, for purposes of simplification, could be considered as basic and which includes five clearly differentiated stages, which would undergo several modifications for each specific patent.

Firstly, there is always a stage which involves grinding the fish which is to serve as a base for the product, followed by a second stage of homogenisation of the mass of ground fish, at the end of which there is a third stage including addition of the aforementioned complementary ingredients, which are also homogenised in a repetition of the second stage.

In fourth place is the extrusion and cutting stage of the product, in order to give it its final external appearance, for which some extrusions are cylindrical with endless cutting (ES2034920) while other are laminar with sequential cutting, such as this one, allowing to include not only longitudinal elements but also transverse ones such as simulated eyes, and which also allow to define the longitudinal shape of the substitute (ES2048672, ES2055668, ES2125196).

In fifth and final place is the thermal treatment of the properly extruded product, which often is a single treatment (ES2048672, ES2055668) but which can also be divided into two stages (ES2010637) or include a cold blast afterwards (ES2125196).

On occasion, the order of the above stage may be changed, such as when performing the thermal treatment between the extrusion and the cutting (ES2048672).

Nevertheless, the laminar extrusion and sequential cutting process has the disadvantage of having the longitudinal side cuts of the substitute parallel and completely straight, which is in detriment of the desired baby eel appearance.

There also exists a tendency to abuse of adding water to later achieve a proper jellification, not considering that the surimi base already has a high water content, so that finally the desired texture and consistency properties are obtained at the cost of the product's nutritional quality.

These disadvantages are solved in the present patent by the novelties included in the thermal treatment stage, which allow to reduce the water proportion while incorporating a number of additives which change the common organoleptic properties of these baby eel substitutes.

Not only the product but also its fabrication method is clearly different from previously known ones, due to the novelties introduced in the thermal treatment stage where both the outer appearance and the texture of the finished product are improved, also changing its nutritional and organoleptic properties.

The applicant is not aware of any baby eel substitute and fabrication method with the characteristics of the one hereon described.

DESCRIPTION OF THE INVENTION

The invention of the present memory relates to a baby eel substitute and a fabrication method from among the food products based on fish derivatives known as surimi and the industrial fabrication processes, characterised in that it includes a novel sequential process in the thermal treatment of the fabrication method which allows to incorporate a number of additives which considerably improve its nutritional, organoleptic, texture and outer appearance properties of the product.

The fabrication method for the product relies on a conventional simplified five-stage model, the first of which stages relates to grinding the fish which is to be the base of the product. The second stage involves homogenisation of the mass of ground fish. The third, which is integrated in the second, is where complementary ingredients are added. As these are added to the mass of ground fish the suspension is again homogenised, as in the second stage. In fourth place is the extrusion and cutting of the product, where it is given its final appearance, and where the extrusion is of a conventional laminar type with sequential cutting, for integration of not only longitudinal elements such as a simulated eel back, but also transverse ones such as simulated eyes and also in order to create the longitudinal shape of the substitute.

These first four stages are performed at a temperature just above the freezing point of water, so that the hygienic and durability conditions are of the ingredients of the process are increased, without affecting the solubility of the additives.

In the extrusion process, three masses of different hues are pumped by independent devices towards the extrusion nozzle, from which the mass without colorant appears at the bottom two thirds and the slightly coloured mass in the upper third. Between these at a distal position appears the third, strongly coloured mass as a narrow cylinder simulating the eel's eyes.

From the nozzle they pass to the outlet sheet, where the three masses are compressed into a single mass with the simulated eel shape and from there it is sequentially cut by a blade.

In fifth place comes the thermal treatment of the duly extruded and cut product. This stage is further divided into four stages, to wit: an excess water drainage stage, a preliminary cooking stage in animal or vegetable oil at between 40 and 60° C. for 60 to 120 seconds, a final cooking stage also in animal or vegetable oil at 100 to 130° C. for 20 to 60 seconds, the two in independent vats, and a final stage of draining the excess oil.

The first of these eliminates the excess water which may remain in the suspension after the extrusion process, and leads to the second in which the product undergoes an initial jellification and in which gelling agents finish fixing the water of the suspension so that, immediately after this, in the final cooking stage the product is fully jellified without any irregularities in its surface due to the typical action of hot oil on water pockets. However, there is an alteration of the shape of the extruded product, as the differential cooking of the product's surface and interior implies an increased convexity of such product, which becomes significant in its transverse cutting, where the straight cuts of the fourth stage practically disappear and an overall appearance is achieved which is truer to the authentic model.

Finally, the excess oil is drained off the finished product to avoid an excessively greasy appearance and texture, although a thin layer of oil is allowed to remain on it to give rise to an outer texture similar to that of the dermal mucous of the true baby eel, also leading to a slight taste difference between the outer and inner part of the substitute, as in the true eel, and lastly simplifies its final cooking by the consumer as the grease layer prevents the product from sticking to a frying pan if the later has not been previously greased.

The drained oil is recovered and returned to the thermal treatment vats by conventional means.

The water proportion is not only reduced by the fifth stage of the fabrication method, but also due to the addition of white wine, which allows to partially replace it.

Furthermore, the oil-cooking process also allows to reduce the its proportion in the initial mixture, replaced by other additives such as starch and flours which enhance jellification, are cheaper and present better nutritional properties than animal or vegetable oils used in these substitutes. In this manner, the final proportions of the product with respect to its total mass are the following.

The base of ground fish muscle represents between 50% and 60% of the total. As regards the additives, there are water, in the state just before freezing and in a proportion between 8 and 12%; this is complemented by white wine, with 2 to 4%, as well as animal or vegetable oil with 1 to 2%, potassium or sodium salt between 1 and 3%, sugar up to 1%, ovoalbumin between 4 and 6%, flours added between 7 and 16%, and starch also between 7 and 16%.

Also added are garlic and white pepper with a top proportion of 0.5% each, cryoprotectors to a maximum of 0.5% and preserver potassium sorbate up to 0.5%.

Aromas of crab, oyster and eel are present and represent together between 1 and 1.5% of total weight. Alginates from seaweed extracts represent at most 2% of the total mass.

Finally, cephalopod ink is added as a natural colouring up to 4% in varying proportions depending on the mass corresponding to the different layers of the extruded product; the ink will be added in growing proportions to the "abdominal" or lower layer, the "dorsal" or upper layer and the simulated eyes.

PREFERRED EMBODIMENT OF THE INVENTION

In view of the above, the present invention relates to a baby eel substitute and method for fabrication thereof, from among food products based on fish, known as "surimi" and their industrial fabrication methods, essentially characterised in that it includes a novel sequential thermal treatment process, within its fabrication method, which allows to incorporate a number of additives to its formulation which determine the product's nutritional, organoleptic, texture and outer appearance, for which without representing the limits of the invention, the following is a specific example of an embodiment.

The fabrication method begins by a cutting and grinding of the fish muscle, supplied as 50% of the total weight, in conventional vats of those commonly known as cutters, at a temperature of 0° C.

Immediately afterwards the fish mass is homogenised in conventional grinding and stirring vats at the same temperature. In these are directly added the additional ingredients, that is, water as 11% of total weight, still in liquid state and with cryoprotectors in a proportion of 0.25% already dissolved in it, white wine as 3%, vegetable oil as 2%, potassium salt as 2% also, sugar as 0.5%, ovoalbumin as 4.5% and flours as 10%.

After this are aromas of crab, oyster and baby eel as 1% of total weight, and finely ground garlic and white pepper in a proportion of 0.5% for the former and 0.2% for the latter.

Lastly are added the preserver potassium sorbate as 0.2% and alginates from seaweed extracts as 1.5%.

This basic suspension is common to the three independent masses which take part in the extrusion process; however, each one of these further incorporates cephalopod ink and flour starch in different proportions.

Thus, to the mass corresponding to the "abdominal" or lower layer is not added ink, but is added flour starch as 13.35%, while to that corresponding to the "dorsal" or top layer is added a 1.5% proportion of ink and a 11.85% of flour starch, while the layer corresponding to the eyes carries ink at 4% and flour starch as 9.35%.

While the aforementioned ingredients are being added, the second homogenisation stage is maintained constantly and at the end of said addition the extrusion and cutting stage of the product directly begins, in which the product is granted its final outer appearance.

During the conventional layer extrusion and sequential cutting the three different masses are pumped by independent elements towards the extrusion nozzle, from which emerges the mass without colorant in the two lower thirds and the slightly coloured mass in the top third, in addition appearing between these and in a longitudinally distal position the third, strongly coloured mass as a narrow cylinder.

When passing through the outlet sheet, the three masses are compressed into a single mass with the simulated baby eel shape from which point it is cut sequentially by a blade.

The cut product is drained conventionally from its water content and falls directly onto a vegetable oil vat at 50° C., where jellification of the product begins and from which after 90 seconds, it passes to a second vat of vegetable oil at 120° C. in which the product remains for only 40 seconds in order to end the jellification and pre-cooking process, before being taken to the drainage stage conventionally, with recovery of the drained oil to the thermal treatment vats.

The essence of the invention is not changed by variations in shape, size and arrangement of the component elements, described in a non-limiting manner, sufficing for reproduction by an expert in the field.

What is claimed is:

1. A baby eel substitute, comprising:
    ground fish muscle, representing between 50 and 60% of total final mass,
    water, in a state immediately above freezing, in a proportion which can vary between 8 and 12%,
    white wine between 2 and 4%,
    vegetable or animal oil, in a proportion between 1 and 2%,
    sodium or potassium salt between 1 and 3%,
    sugar, up to a maximum of 1%,
    ovoalbumin, in a proportion between 4 and 6%,
    flour, in a proportion between 7 and 16%,
    starch, in a proportion between 7 and 16%,
    garlic and white pepper, in a maximum proportion of 0.5% each,
    cryoprotectors in a maximum proportion of 0.5%,
    potassium sorbate, as a preserver in a maximum proportion of 0.5%
    aromas of crab, oyster and baby eel, jointly, between 1 and 1.5%
    alginates, from seaweed extract, up to a maximum of 2%, and
    cephalopod ink, up to 4% and in different proportions for each of the three masses, such that the ink is added in increasing proportion from the "abdominal" or bottom layer to the "dorsal" or top layer and finally to the simulated eyes.

2. A method for fabricating the baby eel substitute as claimed in claim 1 comprising:
    grinding fish muscle at 0° C.;
    homogenizing the ground fish;
    adding and stirring in water, wine, oil, cryoprotector, salt, sugar, ovoalbumin and flour and then adding the aromas and spices and finally potassium sorbate and alginates to the homogenized, ground fish;
    dividing the stirred fish into three independent masses for the "abdominal" or lower layer, the "dorsal" or top layer for the eyes; wherein the "abdominal layer or lower layer contains no added ink but includes 13.35% flour starch, the "dorsal" or top layer contains 1.5% cephalopod ink and 9.35% flour starch;
    separately homogenizing the independent masses in a second homogenization and then
        forming the eel substitute by layer extrusion and sequential cutting;
        draining the water from the cut product;
        gelling the product in a vegetable oil vat at 40–50° C. for 60–120 seconds;
        finally cooking the product in a second vat of oil at 100 to 130° C. for 20–60 seconds; and then
            removing the baby eel substitute from the cooking vat for drainage of the excess oil.

* * * * *